(12) United States Patent
Babian

(10) Patent No.: US 8,475,245 B2
(45) Date of Patent: Jul. 2, 2013

(54) VEHICLE AIR DUCT INCLUDING STRENGTH RIB

(75) Inventor: Philip Joseph Babian, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 170 days.

(21) Appl. No.: 11/346,838

(22) Filed: Feb. 3, 2006

(65) Prior Publication Data

US 2007/0184773 A1 Aug. 9, 2007

(51) Int. Cl.
*B60H 1/00* (2006.01)
*B60S 1/54* (2006.01)

(52) U.S. Cl.
USPC .................................... 454/69; 454/124

(58) Field of Classification Search
USPC .................................... 454/69, 124
See application file for complete search history.

(56) References Cited

U.S. PATENT DOCUMENTS

| | | | |
|---|---|---|---|
| 6,256,197 B1 | 7/2001 | Galis | |
| 6,467,170 B2 | 10/2002 | Kato et al. | |
| 6,502,897 B2 | 1/2003 | Neuss et al. | |
| 6,547,301 B1 | 4/2003 | Keller | |
| 6,715,954 B2 | 4/2004 | Mainka et al. | |
| 6,773,340 B2 | 8/2004 | Nakagawa et al. | |
| 6,783,173 B2* | 8/2004 | Nakamura et al. | 296/208 |
| 6,942,910 B2 | 9/2005 | Roberts et al. | |
| 2005/0067140 A1* | 3/2005 | Sogame | 165/42 |
| 2006/0101722 A1* | 5/2006 | Ealer, Sr. | 52/12 |

FOREIGN PATENT DOCUMENTS

| | | |
|---|---|---|
| JP | 11-189027 | 7/1999 |
| JP | 2001-310616 | 11/2001 |
| JP | 2005-186799 | 7/2005 |

* cited by examiner

*Primary Examiner* — Steven B McAllister
*Assistant Examiner* — Helena Kosanovic
(74) *Attorney, Agent, or Firm* — Gifford, Krass, Sprinkle, Anderson & Citkowski, P.C.

(57) ABSTRACT

A vehicle air duct includes a plurality of walls that are connected and define an interior air space. The plurality of walls includes inner and outer surfaces. The air duct extends from a first end to a second end where the first end includes a connection opening. At least one of the plurality of walls includes at least one rib in a region corresponding to the connection opening. The rib extends outward from the outer surface of the at least one wall for maintaining the shape of the vehicle air duct.

9 Claims, 3 Drawing Sheets

VEHICLE AIR DUCT INCLUDING STRENGTH RIB

FIELD OF THE INVENTION

The invention relates to air ducts, and with more particularity to vehicle air ducts.

BACKGROUND OF THE INVENTION

Air ducts are commonly utilized in an automotive vehicle to transport air from one portion of the vehicle for distribution to another part of the vehicle. Such air ducts are typically formed of a plastic polymer material that may be molded to a desired shape. The shape is commonly dictated by other components within the vehicle which must be accommodated by the air ducts in a vehicle.

The air ducts commonly include one or more entrances or openings formed in the duct to mate with either another duct or to distribute the air via a register or opening. The size and shape of the entrance will be dictated by the design parameters of an air handling system. In the case where an entrance of a duct includes a severe aspect ratio, meaning the width has a corresponding distance that exceeds the height, or vice versa, commonly used molding techniques are insufficient to create such ducts. For example, where an entrance includes the severe aspect ratio, the duct may warp or deform its shape after being removed from a tool or mold resulting in ducts that are difficult to install on a vehicle.

Additionally, after a duct has been installed in a vehicle, the duct may be subjected to forces or loads either from an occupant of a vehicle or from other components installed in the vehicle. Such forces or loads may cause the duct to deform and possibly disengage from another duct.

There is therefore a need in the art for an improved air duct that will maintain its shape during the manufacture and molding of the duct, as well as exhibit improved rigidity and maintain the duct shape when it is installed in a vehicle.

SUMMARY OF THE INVENTION

A vehicle air duct includes a plurality of walls that are connected and define an interior air space. The plurality of walls includes inner and outer surfaces. The air duct extends from a first end to a second end where the first end includes a connection opening. At least one of the plurality of walls includes at least one rib in a region corresponding to the connection opening. The rib extends outward from the outer surface of the at least one wall for maintaining the shape of the vehicle air duct.

DETAILED DESCRIPTION OF THE PREFERRED EMBODIMENTS

Figure 1:
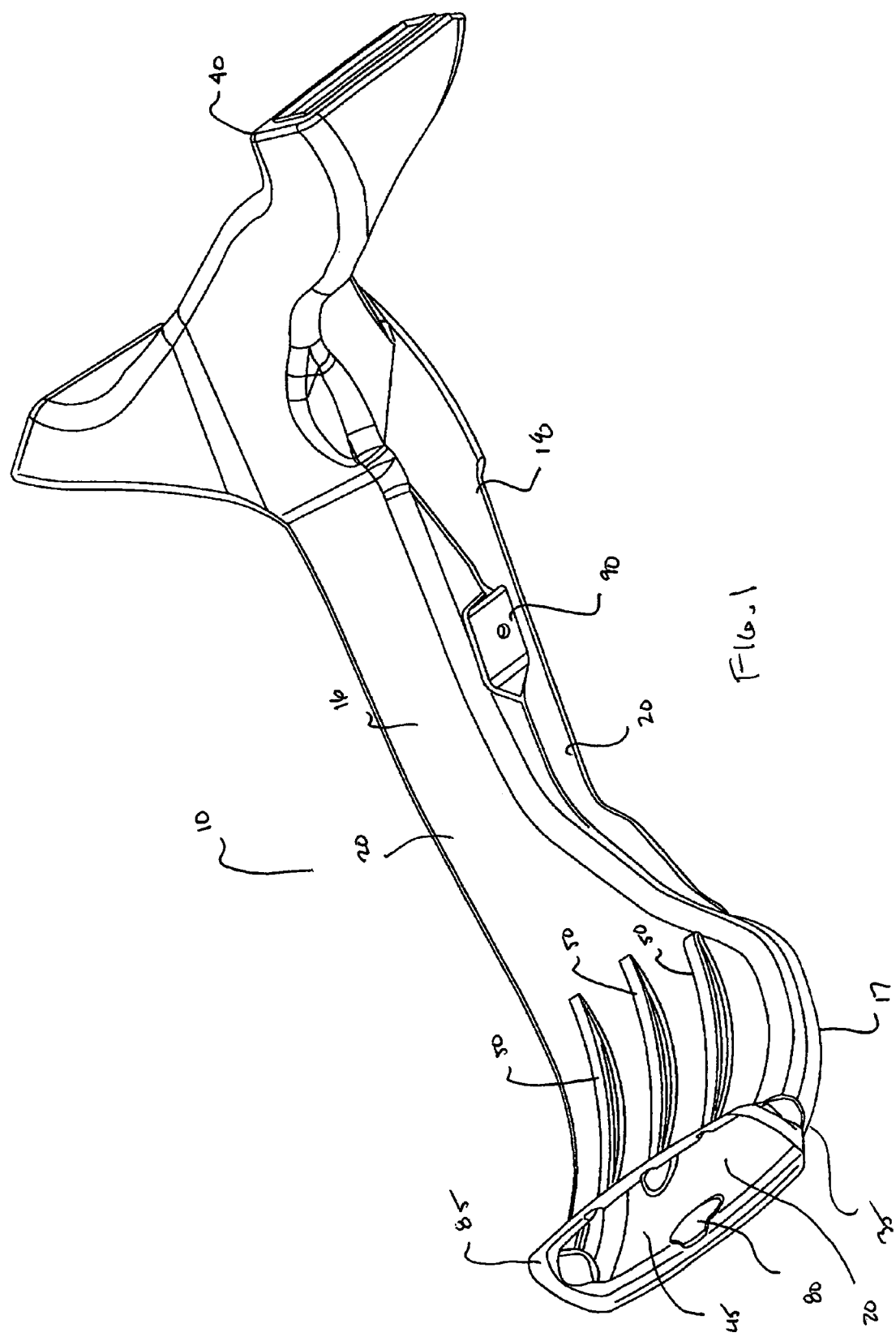
FIG. 1 is a perspective view of a vehicle air duct according to the present invention.
Figure 2:
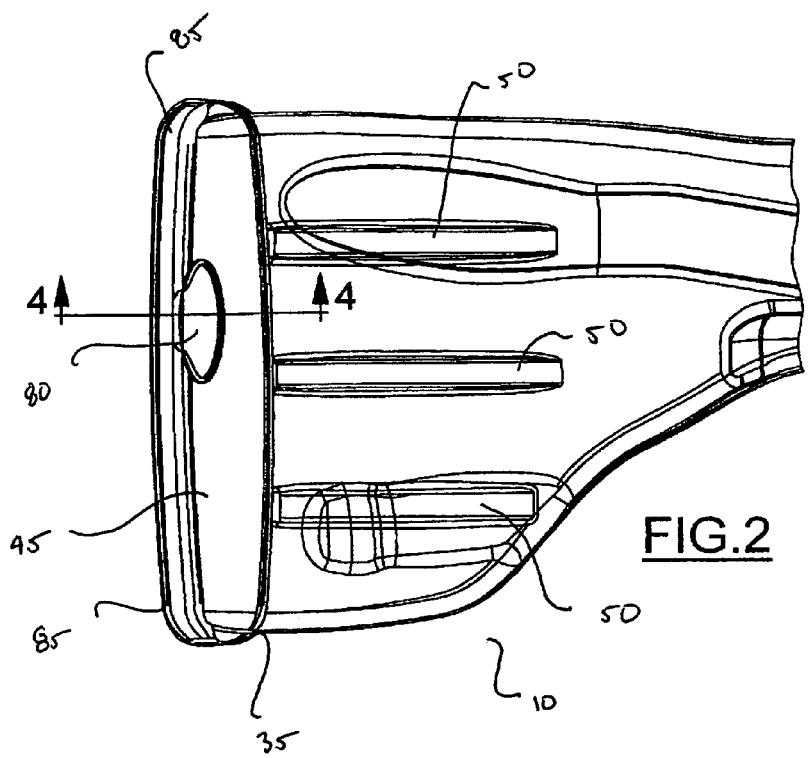
FIG. 2 is a partial plan view of a vehicle air duct detailing the connection opening.

Referring to FIG. 1, there is shown a vehicle air duct 10 according to the present invention. The vehicle air duct 10 includes a plurality of walls 15 that are connected and define an interior air space 20. As shown in the figure, the plurality of walls 15 includes a top wall 16, bottom wall 17, and side walls 18 connected to each other. The walls include inner and outer surfaces 25, 30. The vehicle air duct 10 extends from a first end 35 to a second end 40. The first end 35 includes a connection opening 45. At least one of the plurality of walls 15, the top wall 16 as shown in FIG. 1, includes at least one rib 50 formed thereon in a region corresponding to the connection opening 45. The rib 50 extends outward from the outer surface 30 of the at least one wall 15 for maintaining the shape of the vehicle air duct 10.

Figure 3:
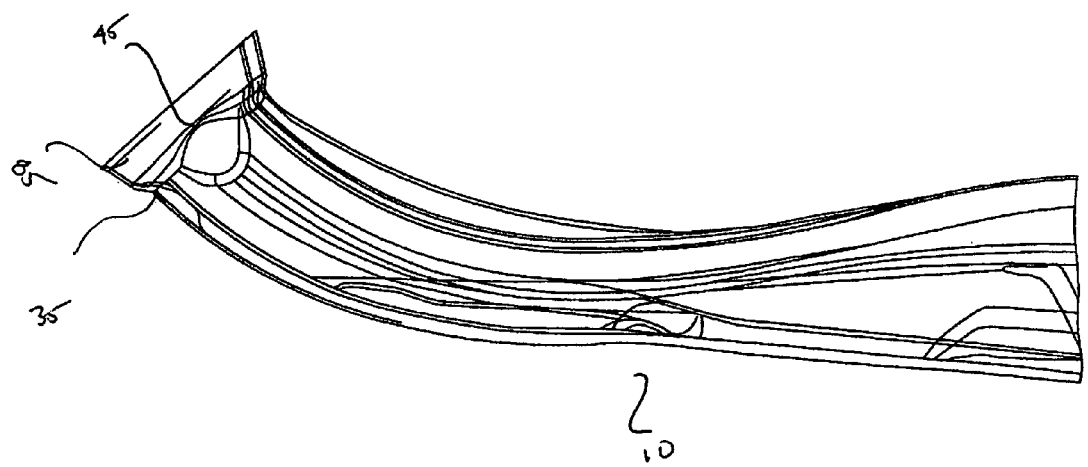
FIG. 3 is a partial side view detailing the connection opening of the vehicle air duct.

Again as can be seen in FIGS. 1 and 3, the first end 35 of the air duct 10 includes an arcuate shape proximate the connection opening 45. The arcuate shape allows the air duct 10 to be mated with an HVAC outlet 55 and then pass down and under a center console of a vehicle to route air to a rear compartment of a vehicle.

In one aspect of the invention, the at least one rib 50 comprises a plurality of spaced ribs 50 that are formed on at least one of the plurality of walls 15. In the embodiment shown in the figures, three ribs 50 are formed on a top wall 16 of the air duct 10 such that the ribs 50 extend upward and outward from the outer surface 30 of the at least one wall 15.

Figure 5:
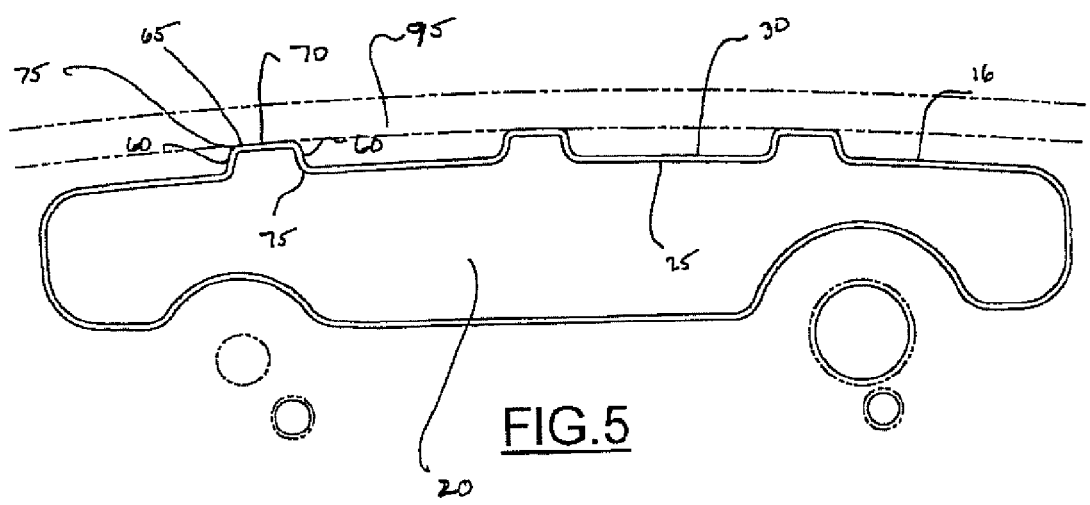
FIG. 5 is a sectional view taken across the ribs formed on the top outer surface of the vehicle air duct.

Referring to FIG. 5, it can be seen that the at least one rib 50 or plurality of ribs 50 as the design requires includes a pair of outwardly extending side walls 60 that extend from the outer surface 30 of the air duct 10. The outwardly extending side walls 60 are joined by a top wall 65. The top wall 65 includes a planar top surface 70 that is operative to support a mating surface 95 above the air duct 10 when it is installed. In another aspect of the invention, the side walls 60 of the ribs 50 may include a radius 75 formed at a connection with the top wall 16 of the air duct 10 and again at a connection with the top surface 70 of the rib 50. The radius 75 allows for a smooth transition from the top wall 16 to the rib 50, as well as provides for removal and molding of the component from a mold without sharp corners that may prevent release of a part.

As can be seen in FIGS. 1 and 5, the connection opening 45 includes a width exceeding a height of the opening. The aspect ratio of the width relative to the height in this situation is large. Such an aspect ratio is not shown in prior art ducts as the duct would be subject to collapse during a manufacture or molding of the duct 10, and would have a weak strength when mounted on a vehicle resulting in possible failure of a connection of the duct with another component. The inclusion of the ribs 50 of the present invention allows for a greater aspect ratio to be utilized while maintaining a strength and integrity of the duct 10 both during the manufacture or molding of the duct 10, as well as when installed on a vehicle.

Figure 4:
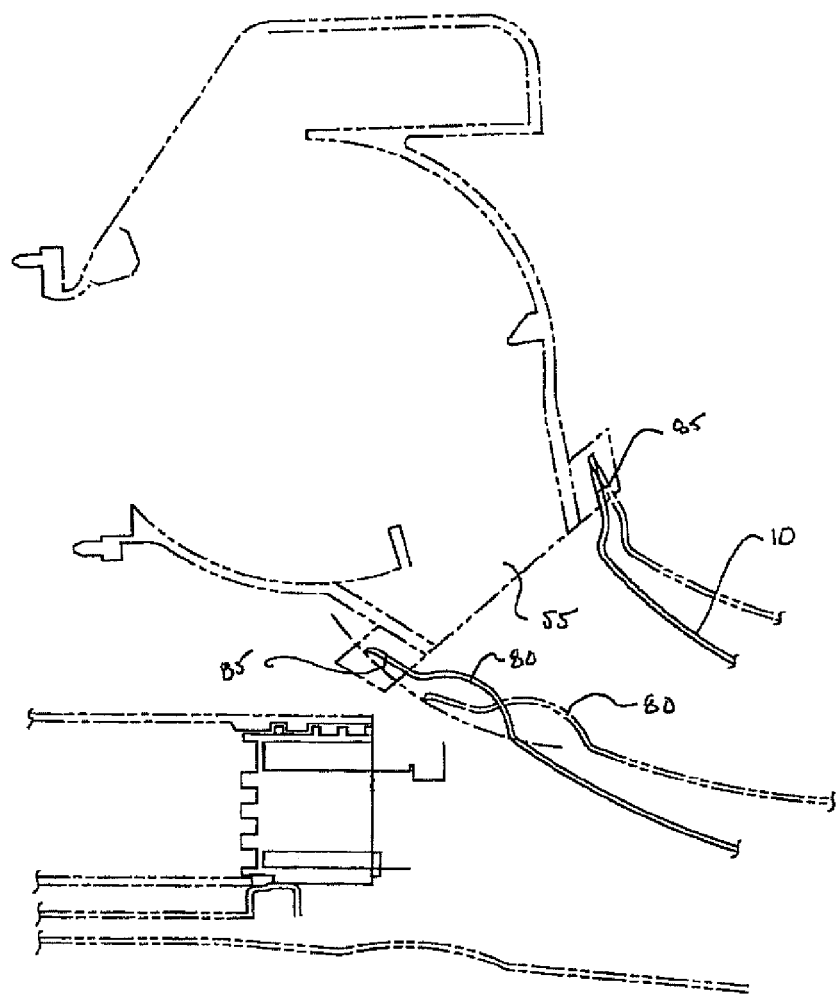
FIG. 4 is a sectional view taken along the line 4-4 of FIG. 2.

In use, the duct 10 of the present invention may be mated with an HVAC opening 55, as best shown in FIG. 4. The duct 10 may be moved towards the corresponding opening 55 on the HVAC duct as shown by the dashed section lines in FIG. 4. The duct 10 is then slid onto the opening 55 of the HVAC duct. The flared opening 85 formed on the connection opening 45 allows for the duct 10 to be easily positioned about the HVAC opening 55. Following positioning of the duct 10 about the HVAC opening 55, the duct 10 may then be fastened to an appropriate reinforcement or member of the vehicle at an attachment point 90, as best shown in FIG. 1.

The invention has been described in an illustrative manner. It is to be understood that the terminology which has been used is intended to be in the nature of words of description rather than limitation. Many modifications and variations of the invention are possible in light of the above teachings.

Therefore, within the scope of the appended claims, the invention may be practiced other than as specifically described.

The invention claimed is:

1. A vehicle air duct comprising:
a plurality of walls connected and defining an enclosed interior air space, the plurality of walls including inner and outer surfaces, the vehicle air duct extending from a first end to a second end, the first end including a connection opening; and
wherein at least one of the plurality of walls includes at least one rib formed thereon in a region corresponding to the connection opening, the rib extending outward from the outer surface of the at least one wall, the at least one rib further defining the interior air space allowing transport of air and maintaining the shape of the vehicle air duct, wherein the at least one rib includes a pair of outwardly extending side walls extending from the outer surface of the air duct and joined by a top wall wherein the top wall of the at least one rib includes a planar top surface supporting a mating surface above the air duct and wherein the pair of outwardly extending sidewalls and top wall extend longitudinally relative to the air duct.

2. The vehicle air duct of claim 1 wherein the plurality of walls includes a top wall, bottom wall and side walls connected to each other.

3. The vehicle air duct of claim 1 wherein the first end of the air duct includes an arcuate shape proximate the connection opening.

4. The vehicle air duct of claim 1 wherein the at least one rib comprises a plurality of spaced ribs formed thereon.

5. The vehicle air duct of claim 4 including three ribs formed thereon.

6. The vehicle air duct of claim 1 wherein the connection opening includes a flared surface formed thereon that extends outward from the opening.

7. The vehicle air duct of claim 1 wherein the side walls of the ribs include a radius formed at a connection with the top surface of the air duct and at a connection with the top surface of the rib.

8. The vehicle air duct of claim 1 wherein the connection opening has a width exceeding a height of the opening.

9. A vehicle air duct comprising:
a plurality of walls connected and defining an enclosed interior air space, the plurality of walls including inner and outer surfaces, the vehicle air duct extending from a first end to a second end, the first end having an arcuate shape terminating at a connection opening; and
wherein at least one of the plurality of walls includes a plurality of ribs formed thereon in a region corresponding to the connection opening, the ribs extending outward from the outer surface of the at least one wall, the plurality of ribs further defining the interior air space allowing transport of air and maintaining the shape of the vehicle air duct wherein the ribs include a pair of outwardly extending side walls extending from the outer surface of the air duct and joined by a top wall wherein the top wall of the ribs include a planar top surface supporting a mating surface above the air duct and wherein the pair of outwardly extending sidewalls and top wall extend longitudinally relative to the air duct.

* * * * *